United States Patent [19]

Takeyama et al.

[11] Patent Number: 4,542,496
[45] Date of Patent: Sep. 17, 1985

[54] LOOP TRANSMISSION SYSTEM AND METHOD OF CONTROLLING THE LOOP-BACK CONDITION THEREOF

[75] Inventors: Akira Takeyama, Yokohama; Kenshi Tazaki, Kashiwa; Satoshi Nojima, Tokyo; Norihiro Aritaka, Yokohama; Teruyoshi Mita, Machida, all of Japan

[73] Assignee: Fujitsu Limited, Kawasaki, Japan

[21] Appl. No.: 525,464

[22] Filed: Aug. 22, 1983

[51] Int. Cl.⁴ ............................................... H04J 3/08
[52] U.S. Cl. ....................................... 370/16; 370/88; 340/825.05
[58] Field of Search ................... 370/88, 16, 15, 86; 340/825.05

[56] References Cited

U.S. PATENT DOCUMENTS

| | | | |
|---|---|---|---|
| 3,569,632 | 3/1971 | Beresin et al. | 370/16 |
| 3,652,798 | 3/1972 | McNeilly et al. | 370/16 |
| 3,859,468 | 1/1975 | Smith et al. | 370/16 |

FOREIGN PATENT DOCUMENTS 53-68046  6/1978  Japan ..................................... 370/88

*Primary Examiner*—Douglas W. Olms
*Attorney, Agent, or Firm*—Staas & Halsey

[57] ABSTRACT

A loop transmission system and a method of controlling the loop-back condition thereof. The loop transmission system comprises a plurality of node stations, a supervisory station, and two duplicate loop transmission lines which transmit signals in opposite directions. In the loop transmission system, the supervisory station first sends out loop-back commands via both of the duplicate loop transmission lines when faults are detected on both of the duplicate loop transmission lines at the same time. Each of the node stations establishes a loop-back path while retaining a connection path to a succeeding node station upon the receipt of a loop-back command. The loop-back path is released only in the node stations which receive signals normally from both of the duplicate loop transmission lines when the supervisory station sends release commands to the node stations after sending the loopback commands.

19 Claims, 14 Drawing Figures

Fig. 2D

| CONDITION | | ROUTE | S V | ND-A | ND-B | ND-C | ND-D |
|---|---|---|---|---|---|---|---|
| BEGINNING OF LOOP-BACK | RECEIVING CONDITION | 0 | × | ○ | ○ | × | × |
| | | 1 | × | × | × | ○ | ○ |
| | COMMAND | 0 | LB-0 ON | LB-0 ON | LB-0 ON | — | — |
| | | 1 | LB-1 ON | | | LB-1 ON | LB-1 ON |
| | OPERATION | | | LB-0 ON | LB-0 ON | LB-1 ON | LB-1 ON |
| LOOP RECONSTRUCTION | RECEIVING CONDITION | 0 | ○ | ○ | ○ | × | ○ |
| | | 1 | ○ | ○ | × | ○ | ○ |
| | COMMAND | 0 | LB-0 OFF | LB-0 OFF | LB-0 OFF | — | LB-1 OFF |
| | | 1 | LB-1 OFF | LB-0 OFF | | LB-1 OFF | LB-1 OFF |
| | OPERATION | | | LB-0 OFF | LB-0 ON | LB-1 ON | LB-1 OFF |
| AFTER LOOP-BACK | RECEIVING CONDITION | 0 | ○ | ○ | ○ | × | ○ |
| | | 1 | ○ | ○ | × | ○ | ○ |
| | COMMAND | 0 | — | — | — | — | — |
| | | 1 | — | — | — | — | — |
| | OPERATION | | — | — | — | — | — |

Fig. 3B

| CONDITION | | ROUTE | SV | ND-A | ND-B | ND-C | ND-D |
|---|---|---|---|---|---|---|---|
| BEGINNING OF LOOP-BACK | RECEIVING CONDITION | 0 | × | ○ | ○ | ○ | × |
| | | 1 | × | × | ○ | ○ | ○ |
| | COMMAND | 0 | LB-0 ON | LB-0 ON | LB-0 ON | LB-0 ON | — |
| | | 1 | LB-1 ON | — | LB-1 ON | LB-1 ON | LB-1 ON |
| | OPERATION | 0 | | LB-0 ON | LB-0 ON | LB-0 ON | |
| | | 1 | | | LB-1 ON | LB-1 ON | LB-1 ON |
| LOOP RECONSTRUCTION | RECEIVING CONDITION | 0 | ○ | ○ | ○ | ○ | × |
| | | 1 | ○ | × | ○ | ○ | ○ |
| | COMMAND | 0 | LB-0 OFF | LB-0 OFF | LB-0 OFF | LB-0 OFF | — |
| | | 1 | LB-1 OFF | — | LB-1 OFF | LB-1 OFF | LB-1 OFF |
| | OPERATION | 0 | | LB-0 ON | LB-0 OFF | LB-0 OFF | |
| | | 1 | | | LB-0 OFF | LB-1 OFF | LB-1 ON |
| AFTER LOOP-BACK | RECEIVING CONDITION | 0 | ○ | ○ | ○ | ○ | × |
| | | 1 | ○ | × | ○ | ○ | ○ |

Fig. 4B

| CONDITION | | ROUTE | S V | ND-A | ND-B | ND-C | ND-D |
|---|---|---|---|---|---|---|---|
| BEGINNING OF LOOP-BACK | RECEIVING CONDITION | 0 | x | o | x | x | x |
| | | 1 | x | x | x | x | o |
| | COMMAND | 0 | LB-O ON | LB-O ON | — | — | — |
| | | 1 | LB-1 ON | — | — | — | LB-1 ON |
| | OPERATION | | | LB-O ON | | | LB-1 ON |
| LOOP RECONSTRUCTION | RECEIVING CONDITION | 0 | o | o | x | x | x |
| | | 1 | o | x | x | x | o |
| | COMMAND | 0 | LB-O OFF | LB-O OFF | — | — | — |
| | | 1 | LB-1 OFF | — | — | — | LB-1 OFF |
| | OPERATION | | | LB-O ON | | | LB-1 ON |
| AFTER LOOP-BACK | RECEIVING CONDITION | 0 | o | o | x | x | x |
| | | 1 | o | x | x | x | o |

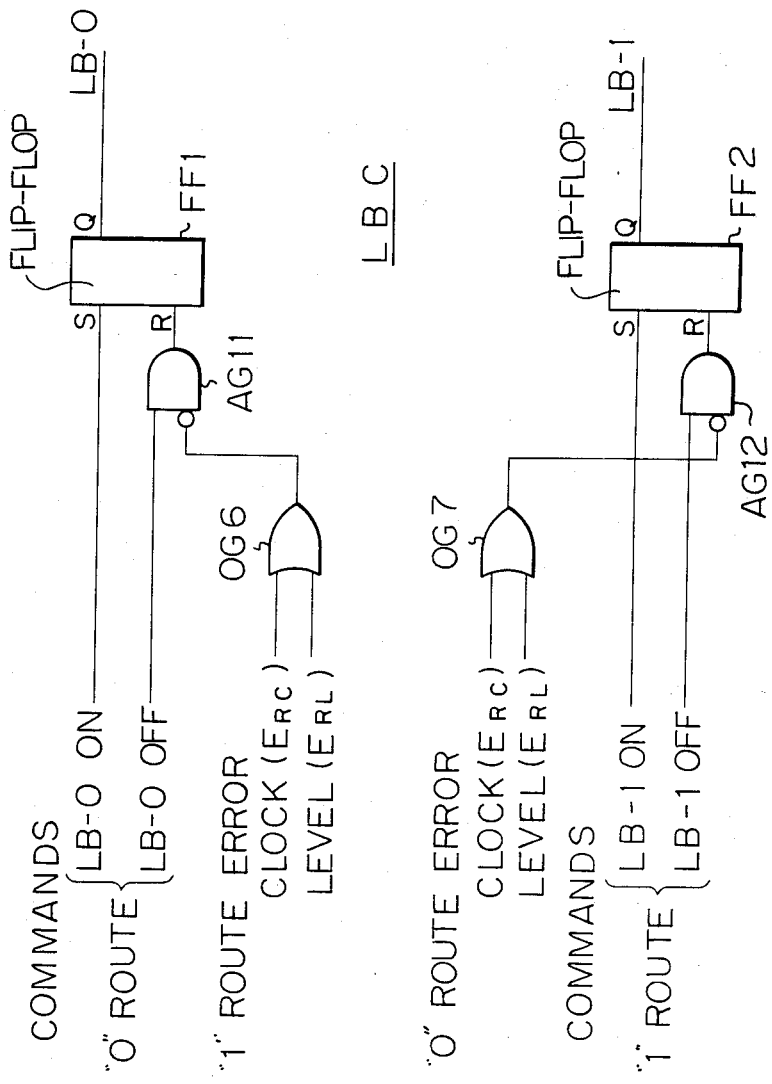

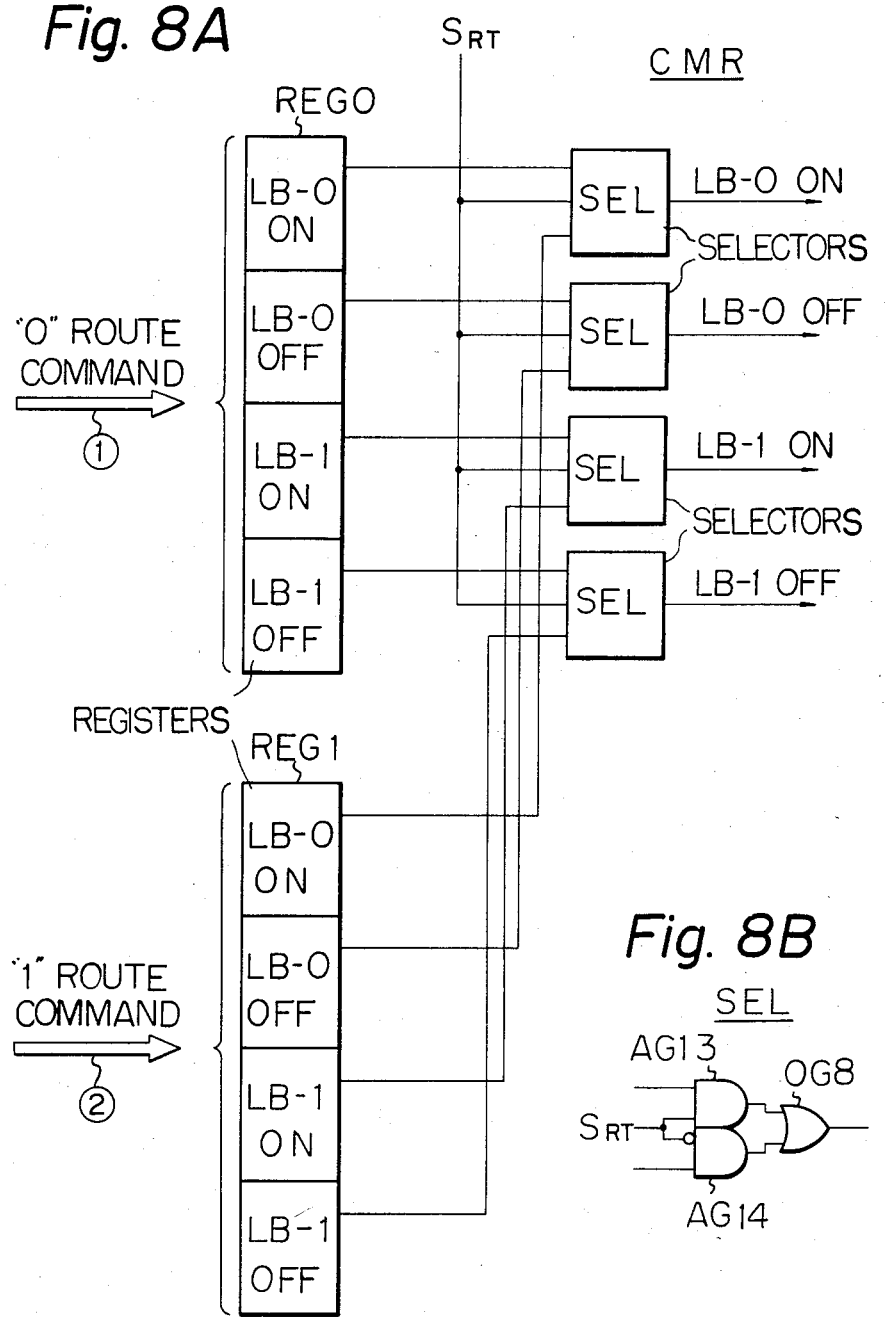
Fig. 8A
Fig. 8B
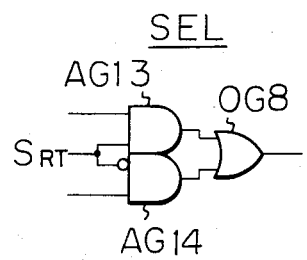

LOOP TRANSMISSION SYSTEM AND METHOD OF CONTROLLING THE LOOP-BACK CONDITION THEREOF

BACKGROUND OF THE INVENTION (1) Field of the Invention

The present invention relates to a loop transmission system and to a method of controlling the loop-back condition thereof, in which loop-back paths from one of two duplicate transmission lines to the other duplicate transmission line are formed in a short time if the duplicate transmission lines become faulty.

(2) Description of the Prior Art

As is illustrated in FIG. 1, in a conventional loop transmission system, a plurality of node stations ND1, ND2, ND3, etc. and a supervisory station SV are mutually connected by duplicate transmission lines TL1 and TL2, and signals are transmitted on the duplicate transmission lines TL1 and TL2 and through the supervisory station SV in opposite directions. In a normal condition, one of the duplicate transmission lines, for example, TL1, is used as an active route, i.e., a "0" route, and the other duplicate transmission line, for example, TL2, is used as a standby route, i.e., a "1" route. If only the duplicate transmission line TL1 becomes faulty at any point thereon, the supervisory station SV detects the fault and immediately switches the duplicate transmission lines so that the standby transmission line TL2 is used as an active route. Therefore, there can be normal communication between each node station. However, if two routes become faulty at the same time, for example, if both of the duplicate transmission lines TL1 and TL2 are cut at the same time, communication on both the active transmission line and the standby transmission line is interrupted. When such a fault is detected, the supervisory station SV connects the input side and the output side of the transmission lines in the node stations on both sides of the cut portion of the transmission lines. For this purpose, there is provided a connection for loop-back, i.e., for returning signals transmitted to each of the node stations. The connection includes a switch which is turned on by the output signal of a control unit which decodes the command sent from the supervisory station SV. To communicate by the transmission path constructed by using the transmission lines in both directions is called "loop-back". If a fault occurs on one or both of the transmission lines, the supervisory station SV can detect the fault from the disturbance of the clock pulses, the disorder of the received frames, and so forth. However, it is impossible to immediately judge where the fault has occurred between two node stations because it generally occurs in a remote place. In order to determine where the fault has occurred, the node stations are sequentially checked, beginning with the node station ND1, which is near the supervisory station. That is, the node station ND1 is, at first, placed in a loop-back condition. If a signal sent from the supervisory station SV to the node station ND1 returns normally to the supervisory station SV, it is determined that the transmission route from the supervisory station SV to the node station ND1 is in a normal condition. Therefore, the loop-back connection of the node station ND1 is released. Then the node station ND2 is placed in a loop-back condition and checked whether or not a signal sent from the supervisory station SV returns normally thereto through the node station ND2. Next, the other node stations are sequentially placed in a loop-back condition and checked whether or not a signal sent from the supervisory station SV returns normally thereto through the node stations. If the signal does not return normally, it is temporarily determined that a fault has occurred between the node station through which the signal sent from the supervisory station SV does not return normally and another node station preceding that node station. Then the supervisory station SV checks every node station in the opposite direction in a similar manner and detects the faulty portion of each of the transmission lines. If it is detected that the same portions of the transmission lines are faulty, the node stations on both sides of the faulty portions are placed in a loop-back condition and communication is resumed by using the transmission lines of both routes and the loop-back paths.

However, in the above-mentioned conventional loop transmission system, it is necessary to perform complex operations for detecting a faulty portion and it is necessary to interrupt communication for a long period of time, especially when the number of node stations is large.

SUMMARY OF THE INVENTION

It is an object of the present invention to eliminate the abovementioned drawbacks of the conventional system and to provide a loop transmission system in which loop-back transmission paths are formed in a short time when a fault is detected in duplicate transmission lines.

According to the present invention, there is provided a loop transmission system comprising a plurality of node stations, a supervisory station, and duplicate loop transmission lines, which lines transmit signals in opposite directions. The supervisory station sends out loop-back commands to both of the duplicated loop transmission lines when faults are detected on both of the duplicate loop transmission lines at the same time. Each of the node stations establishes a loop-back path while retaining a connection to the succeeding node station upon the receipt of a loop-back command, and in that the loop-back path is released only in the node stations which receive signals normally from both of the duplicate loop transmission lines when the supervisory station sends release commands to the node stations after sending the loopback commands.

BRIEF DESCRIPTION OF THE DRAWINGS

FIG. 2D is a diagram illustrating the process of establishing loop-back paths when a fault occurs in the portion shown in FIG. 2A.

FIG. 3B is a diagram illustrating the process of establishing loop-back paths when a fault occurs in the portions shown in FIG. 3A.

FIG. 4B is a diagram illustrating the process of establishing loop-back paths when a fault occurs in the portions shown in FIG. 4A.

FIGS. 6, 7, 8A, and 8B are block circuit diagrams illustrating the practical structures of a transmission line switching circuit, a loop-back control circuit, and a command receiving circuit used in the control circuit of FIG. 5.

DESCRIPTION OF THE PREFERRED EMBODIMENTS

Figure 2A:
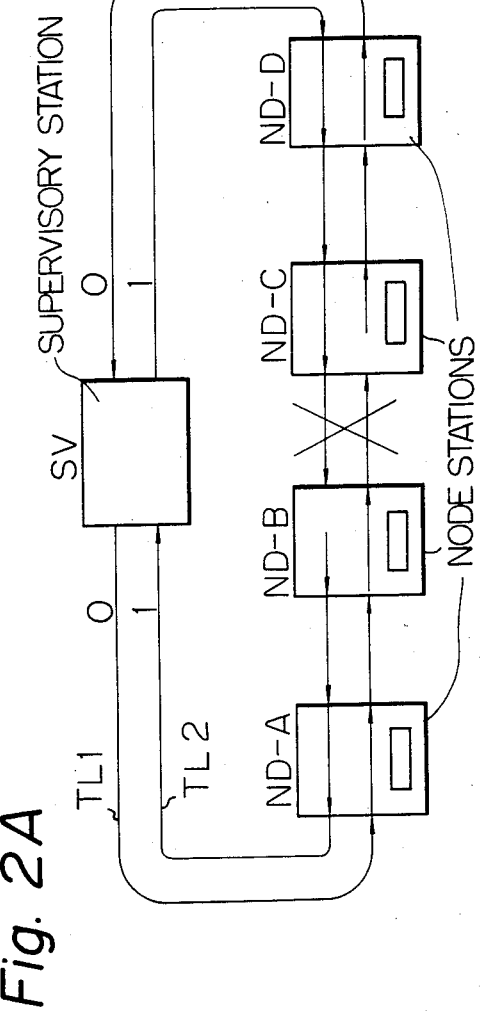
FIGS. 2A through 2C are block circuit diagrams illustrating the condition of each station in the process of establishing loop-back paths when a fault occurs in a portion of a loop transmission system according to the present invention.

An embodiment of the present invention is now described with reference to the attached drawings. As is illustrated in FIG. 2A, a loop transmission system according to the present invention comprises a supervisory station SV and a plurality of, for example, four, node stations ND-A, ND-B, ND-C and ND-D connected by duplicate transmission lines TL1 and TL2. End terminals, a host computer system, and so forth are connected to each node station, and communication between the end terminals, the host computer system, and so forth is performed through each of the node stations ND-A through ND-D and the transmission line TL1 or the transmission line TL2 or both.

Figure 1:
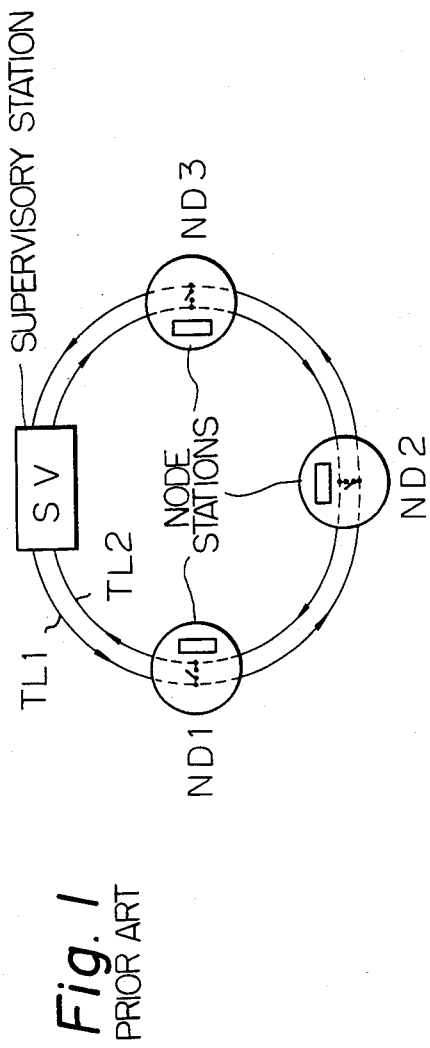
FIG. 1 is a block circuit diagram illustrating the structure of a general loop transmission system.

In the loop transmission system according to the present invention, when the system is in a normal condition, one of the transmission lines, for example, TL1, is used as a active route, i.e., an "0" route, and the other transmission line, for example, TL2, is used as a standby route, i.e., a "1" route, in a manner similar to the system of FIG. 1. If only one of the transmission lines, for example, TL1, becomes faulty at any point thereon, the supervisory station SV detects the fault and immediately switches the transmission lines so that the standby transmission line TL2 is used as the active route. Therefore, communication between each node station can be performed normally.

Figure 2B:
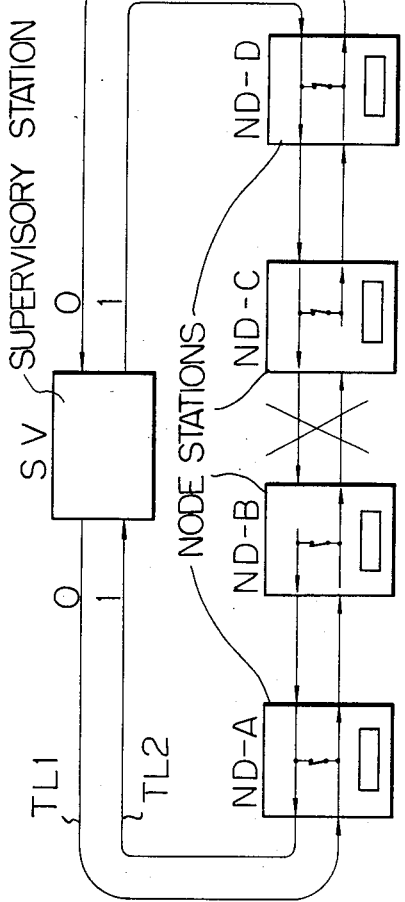

As is illustrated in FIG. 2A, if both of the transmission lines TL1 and TL2 become faulty at the same time between the node stations ND-B and ND-C, loop-back paths are established in the node stations ND-B and ND-C. That is, when the supervisory station SV detects a fault on the transmission lines of both routes from the condition of the signals received from the transmission lines, the supervisory station SV sends loop-back commands LB-0 ON and LB-1 ON on both routes, which commands are received by each node station via an effective transmission line. After receiving the commands LB-0 ON and LB-1 ON, each node station establishes a loop-back route as illustrated in FIG. 2B.

Figure 2C:
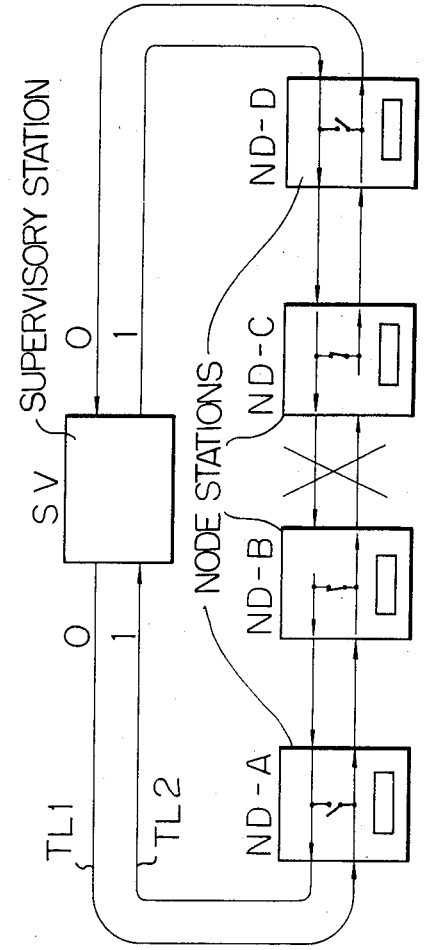

Next, during a loop-back reconstructing status period, the supervisory station sends, for example, after a predetermined time period, commands LB-0 OFF and LB-1 OFF for releasing the loop-back condition of both routes, and thereby the loop-back route is released in each of the node stations ND-A and ND-D in which the receiving condition of both the "0" route and the "1" route is normal. However, in each of the node stations ND-B and ND-C in which a fault in one of the transmission lines is detected, the loop-back path is retained, that is, these node stations remain in the condition assumed just after execution of the commands LB-0 ON and LB-1 ON. Therefore, the total communication system comprises a loop circuit including both the "0" route and the "1" route and the loop-back paths formed in the node stations ND-B and ND-C, as is illustrated in FIG. 2C. This condition of the loop transmission system is maintained until the system is reconstructed, for example, by a maintenance operation, and communication is effected in this condition.

In the loop transmission system according to the present invention, the supervisory station SV sends a command for forming and a command for releasing the loop-back status in the above-mentioned manner. However, in the system according to the present invention, it is not necessary for the supervisory station SV to check from which node stations the signals do not return normally. Therefore, it is possible to establish loop-back paths quickly if both the transmission lines TL1 and TL2 are faulty.

FIG. 2D illustrates in detail the condition of each station in the process for forming loop-back paths when a fault occurs in the portion shown in FIG. 2A. In the time between the occurrence of the fault and the beginning of construction of the loop-back paths, the supervisory station SV determines that it is necessary to form loop-back paths by sensing, for example, the abnormal condition of the transmission clock pulses. In the row of FIG. 2D showing the receiving condition of the transmission lines at the beginning of loop-back, the supervisory station SV detects an abnormal condition of signals on both routes as shown by the Xs. The supervisory station SV has the function of regenerating clock pulses and frames, and the signals passed through the supervisory station SV become normal. Therefore, in each node station, the "0" route is in a normal condition and the "1" route is in an abnormal condition (indicated by 0) or the "0" route is in an abnormal condition and the "1" route is in a normal condition (indicated by X). The supervisory station SV sends the commands for forming the loop-back paths to all of the node stations on both the "0" route and the "1" route. In FIG. 2D, the command "LB-0 ON" means to form a loop-back path so that the signal is returned from the "0" route to the "1" route. In each node station, since only the command on the route whose transmission status is indicated by 0 is receivable, a loop-back path is established depending on the content of the command received via the normal route. Therefore, the loop-back condition of each station becomes as shown in the row designated "OPERATION" in FIG. 2D. After the loop-back paths are established, the condition of each transmission line at each node station becomes normal on both the "0" route and the "1" route except that the "1" route of the node station ND-B and the "0" route of the node station ND-C are indicated by X because these two node stations do not receive an input signal.

Next, during the loop reconstructing status period, the supervisory station SV sends commands for releasing the loop-back paths to all of the node stations at the same time. The command "LB-0 OFF" means to release the loop-back path established from the "0" route to the "1" route. The commands for releasing the loop-back paths are transmitted to all of the node stations except those on the routes indicated by X, and some of the loop-back paths are released. Thereby, the condition illustrated in FIG. 2C is attained. That is, since, in the node station ND-B, signals are not input via the "1" route, the loop-back path thereof is not released. Each node station has a control circuit CT comprising a circuit which determines whether or not the input signals are normal on the "0" route and the "1" route. Depending on the condition of the circuit in the control circuit CT and on the commands for releasing the loop-back paths sent from the supervisory station SV, each node station determines whether or not the loop-back path thereof should be released. The hardware structure of this circuit can be simplified by using logical operation circuits (the structure of which is described in detail later).

It is possible to release the loop-back paths depending on various conditions. For example, each of the loop-back paths can be released when signals sent from the supervisory station SV are received normally via both the "0" route and the "1" route without a level error or a clock pulse error. It is also possible to release the loop-back paths when commands for releasing the loop-back paths are received via both routes or when the same commands for releasing the loop-back paths are received via both routes. It is further possible to release the loop-back paths when a command for releasing a loop-back path is received via one route and signals sent from the supervisory station SV are received normally via another route.

In this way, the loop-back paths are retained in the node stations on both sides of the faulty portion as illustrated in FIG. 2C, and a new communication path is established throughout the system. By using the new communication path, communication is resumed. In this condition, the receiving condition of each station becomes as illustrated in the row designated "AFTER LOOP-BACK" in FIG. 2D.

In the above-mentioned loop transmission system, it is possible for the supervisory station SV to establish a loop-back path within a short time corresponding to the time in which the commands are sent to and received via one node station.

Figure 3A:
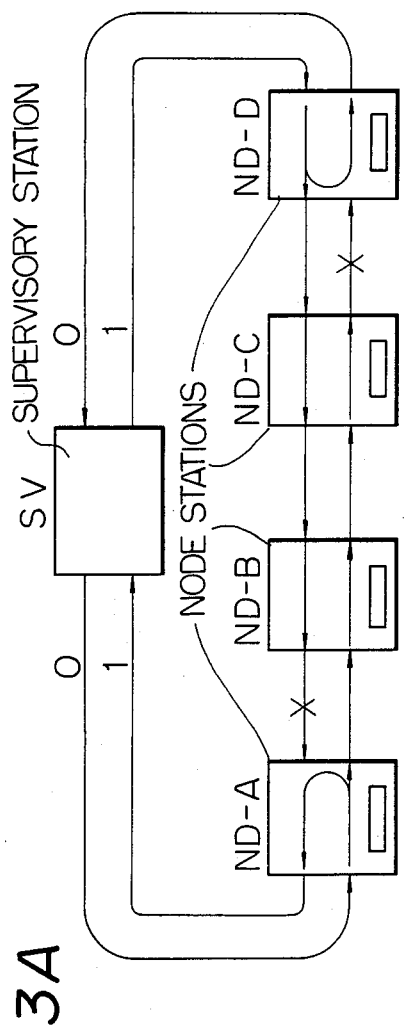
FIG. 3A is a block circuit diagram illustrating the condition of each station in the process of establishing loop-back paths when a fault occurs in other portions of a loop transmission system according to the present invention.

FIGS. 3A and 3B illustrate another example of a faulty condition occurring in the system according to the present invention. As is shown in FIG. 3A, the transmission line on the "0" route between the node stations ND-C and ND-D and the transmission line on the "1" route between the node stations ND-B and ND-A are faulty. In this case, it is necessary to appropriately form loop-back paths, because both of the commands LB-0 and LB-1 sent from the supervisory station SV are received by each of the node stations ND-B and ND-C. For example, these node stations ND-B and ND-C are controlled by a command received via the active route or operations initiated by both of the commands LB-0 and LB-1 are inhibited. As a result of such control operations, at least the loop-back paths formed in the node stations ND-A and ND-D are retained, and the node stations ND-B and ND-C are separated from the communication system.

Figure 4A:
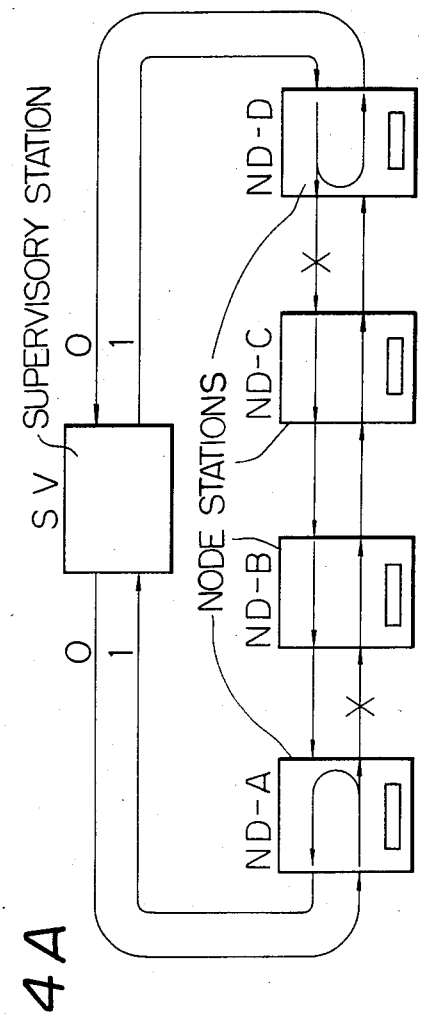
FIG. 4A is a block circuit diagram illustrating the condition of each station in the process of establishing loop-back paths when a fault occurs in still other portions of a loop transmission system according to the present invention.

FIGS. 4A and 4B illustrate a third example of a faulty condition occurring in the system according to the present invention. In this example, the "0" route is faulty between the node stations ND-A and ND-B, and the "1" route is faulty between the node stations ND-D and ND-C. In this case, the commands sent from the supervisory station SV do not reach the node stations ND-B and ND-C, and, therefore, these two node stations are immediately separated from the communication system. However, loop-back paths are formed in the node stations ND-A and ND-D, and communication is maintained.

Figure 5:
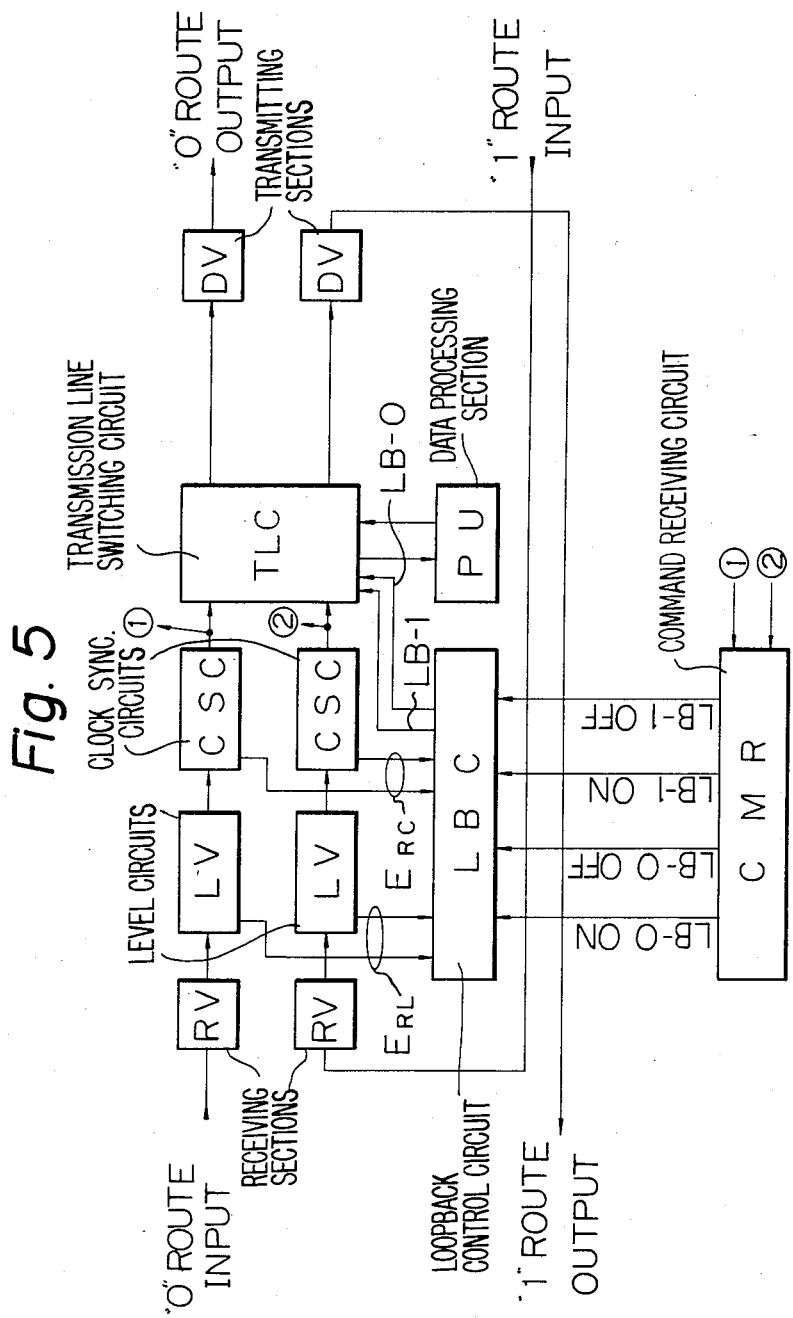
FIG. 5 is a block circuit diagram illustrating a control circuit in a node station used in a loop transmission system according to the present invention.

FIG. 5 is a diagram illustrating the structure of a control circuit of a node station which is used in a loop transmission system according to the present invention. In FIG. 5, RV designates a receiving section which includes a signal receiving amplifier etc. If the transmission line is composed of an optical fiber line, the receiving section RV includes an optical electric transducer. LV designates a level reproducing circuit which includes an automatic level control circuit or an automatic gain control circuit or the like. CSC designates a clock synchronizing circuit which extracts clock pulses and frame synchronizing pulses from a received signal. TLC designates a transmission line switching circuit, the structure of which is described in detail later. DV designates a transmitting section including a signal driver circuit and, if the transmission line is composed of an optical fiber line, an electric optical transducer. LBC and CMR designate a loop-back control circuit and a command receiving circuit, respectively, which are described in detail later. PU is a data processing section a communicating unit for processing received data and transmission data.

In the control circuit of FIG. 5, the information on the transmission lines input via the "0" route and the "1" route is input into the transmission line switching circuit TLC via the corresponding receiving sections RV, the level reproducing circuits LV, and the clock synchronizing circuits CSC. Each of the level reproducing circuits LV checks the level of a signal input thereinto and outputs a level error signal $E_{RL}$ which is supplied to the loop-back control circuit LBC if the magnitude of the signal is smaller than a predetermined value. Each of the clock synchronizing circuits CSC outputs a clock error signal $E_{RC}$ supplied to the loop-back control circuit LBC if the synchronization of extracted clock pulses is disturbed. Information necessary for the node station is extracted from each signal path in the transmission line switching circuit TLC and transmitted to the data processing section PU. Transmission data is supplied from the data processing section PU to the transmission line switching circuit TLC and input into the transmission line. The output signal of each clock synchronizing circuit CSC is supplied to the command receiving circuit CMR. Data output from the transmission line switching circuit TLC is sent to other node stations from the transmission sections DV. It is possible to receive the abovementioned loopback commands (LB-0 ON, LB-0 OFF, LB-1 ON, LB-1 OFF) sent from the supervisory station SV as long as the transmission lines on the receiving sides are in a normal condition. The commands are received by the command receiving circuit CMR, which holds the commands therein and sends them to the loop-back control circuit LBC as loopback control signals. The loop-back control circuit LBC performs logical operations on the error signals $E_{RL}$ and $E_{RC}$ (input status signals) input from the level reproducing circuits LV and clock synchronizing circuits CSC and on the received commands input from the command receiving circuit CMR and transmits a loop-back control signal LB-0 or LB-1 to the transmission line switching circuit TLC so as to control it.

Figure 6:
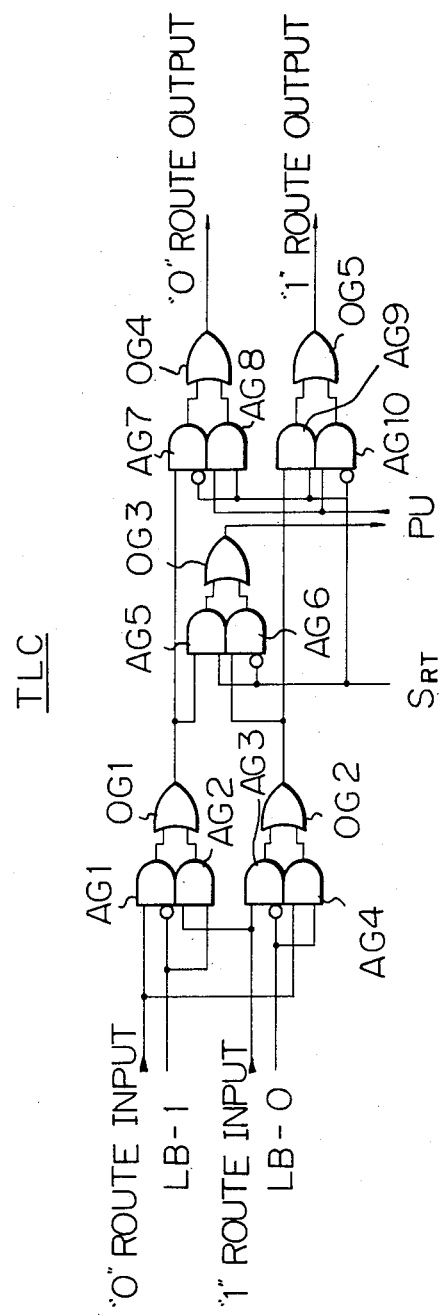

FIG. 6 illustrates the structure of the transmission line switching circuit TLC. The input signals from the "0" route and the "1" route are logically controlled at the first stage of the circuit TLC by using the signals LB-0 and LB-1 to form the loop-back paths, and the switching operation is performed between the loop-back condition from the "0" route to the "1" route or vice versa and the condition of normal connection in which the same "0" routes or the same "1" routes are mutually connected. That is, if the loop-back signals LB-0 and LB-1 are both low, the input signal from the "0" route passes through the AND gate AG1 and the OR gate OG1 and the input signal from the "1" route passes through the AND gate AG3 and the OR gate OG2. If the loop-back signal LB-0 is high, the input signal from the "0" route passes through the AND gate AG4 and the OR gate OG2, and if the loop-back signal LB-1 is high, the input signal from the "1" route passes through the AND gate AG2 and the OR gate OG1. Thereby, a loop-back path is established. The transmission of information extracted from the "0" route or the "1" route to the data processing section PU and the transmission of information from the data processing section PU to the "0" route or the "1" route is controlled by a route switching signal $S_{RT}$ in the second stage circuit comprising AND gates AG5 and AG6 and an OR gate OG3. The route switching signal $S_{RT}$ also controls the third stage circuit, which comprises AND gates AG7 through AG10 and OR gates OG4 and OG5. If the route switching signal $S_{RT}$ is low, the output signal from the OR gate OG1 passes through the AND gate AG7 and the OR gate OG4 and is transmitted to the "0" route. In this condition, the signal output from the data processing section PU passes through the AND gate AG10 and the OR gate OG5 and is transmitted to the "1" route. In a similar manner, if the route switching signal $S_{RT}$ is high, the signal output from the OR gate OG2 is transmitted to the "1" route, and the signal output from the data processing section PU is transmitted to the "0" route.

FIG. 7 illustrates a practical structure of the loop-back control circuit LBC used in the circuit of FIG. 5. The loop-back control circuit LBC comprises AND gates AG11 and AG12, OR gates OG6 and OG7, and flip-flop circuits FF1 and FF2. In FIG. 7, if the command LB-0 ON or LB-1 ON is sent from the supervisory station SV, the flip-flop circuit FF1 and FF2 is set and the loop-back signal LB-0 or LB-1 is generated. If the command LB-0 OFF or LB-1 OFF is sent from the supervisory station SV and no fault is detected, the flip-flop circuit FF1 or FF2 is reset through the AND gate AG11 or AG12. When a fault is detected, i.e., when a clock error or a level error is detected, the clock error signal $E_{RC}$ or the level error signal $E_{RL}$ applied to the OR gate OG6 or OG7 becomes high. In this condition, execution of the commands LB-0 OFF and LB-1 OFF is inhibited by the AND gates AG11 and AG12 and the loop-back signal LB-0 or LB-1 is not released. That is, at the node station in which the receiving condition of the transmission line is faulty, even if the release command LB-0 OFF or LB-1 OFF is sent from the supervisory station SV after the loop-back path is formed depending on the previous command, the loop-back path is not released. Thereby, reconstruction of the loop-back path is performed.

FIG. 8A illustrates an example of the command receiving circuit CMR used in the circuit of FIG. 5. In the command receiving circuit CMR of FIG. 8, the commands on the "0" route and the "1" route are latched or stored by corresponding command registers REG0 and REG1 whose output signals are sent to selectors SEL corresponding to the kinds of commands. The selectors select the signals received from the "0" route or the "1" route depending on the potential level of the route switching signal $S_{RT}$ supplied thereto. Each of the selectors SEL comprises, as is illustrated in FIG. 8B, AND gates AG13 and AG14 and an OR gate OG8.

As was mentioned above, according to the present invention, when the supervisory station SV detects a fault in the transmission lines and instructs node stations to form loop-back paths, the supervisory station SV first sends to all of the node stations commands for forming loop-back paths and then sends to all of the node stations commands for releasing the loop-back paths. The node stations release the loop-back paths when a command or commands are received and when a predetermined receiving condition is satisfied, thereby establishing the necessary loop-back paths. Therefore, it is possible to form loop-back paths in particular node stations in a short time. For this reason, the present invention is particularly advantageous in a communication system having a lot of node stations.

We claim:

1. A loop transmission system, comprising:
   a plurality of node station means;
   a supervisory station for sending a loop-back command and a release command; and
   duplicate loop transmission lines, connected to said plurality of node station means and said supervisory station, which lines transmit signals in opposite directions;
   said supervisory station sends out the loop-back command to both of said duplicate loop transmission lines when faults are detected on both of said duplicate loop transmission lines at the same time, wherein each of said node station means being for establishing a loop-back path while retaining a connection path to an adjacent node station means upon the receipt of the loop-back command, and for releasing said loop-back path only in the node station means which receive signals normally from both of said duplicate loop transmission lines when said supervisory station sends the release command to said node station means after sending said loop-back command.

2. A loop-transmission system according to claim 1, wherein said loop-back path is released only in said node station means which receive said release command from both of said duplicate loop transmission lines.

3. A loop-transmission system according to claim 2, wherein said loop-back path is released only in said node station means which receive the same release command from both of said duplicate loop transmission lines.

4. A loop transmission system according to claim 1, wherein said loop-back path is released only in said node station means which receive a release command from one of said duplicate transmission lines and receive signals normally from the other of said duplicate transmission lines.

5. A loop transmission system according to claim 4, wherein each of said node station means determine whether said signals are received normally when said signals have a magnitude larger than a predetermined value and when the synchronization of clock pulses extracted from said signals is not disturbed.

6. A loop transmission system, comprising:
   a plurality of node stations;
   a supervisory station for transmitting a loop-back command and a release command;
   two duplicate loop transmission lines, connected to said plurality of node stations and said supervisory station, which lines transmit signals in opposite directions;

each node station comprises:
- a connection line, connected to said two duplicate loop transmission lines, for returning signals received from one of said two duplicate loop transmission lines to the other of said two duplicate loop transmission lines; and
- a control circuit, operatively connected to said connection line, for controlling the turning on and the turning off of said connection line, said control circuit turning on said connection line in accordance with the loop-back command transmitted from said supervisory station and turning off said connection line when the release command is transmitted from said supervisory station after the transmission of said loop-back command and when each node station receives signals normally from both of said duplicate loop transmission lines.

7. A loop transmission system according to claim 6, wherein each of said node stations further comprises:
- a level error detecting circuit, operatively connected to said two duplicate loop transmission lines, which outputs a level error signal when said signals have a magnitude smaller than a predetermined value; and
- a clock error detecting circuit, operatively connected to said connection line, said control circuit and said level error detecting circuit, which outputs a clock error signal when the synchronization of clock pulses extracted from said signals is disturbed.

8. A loop-transmission system according to claim 7, wherein each of said node stations determines whether said signals are received normally when said level error detecting circuit does not output said level error signal and said clock error detecting circuit does not output said clock error signal.

9. A loop transmission system according to claim 7, wherein said control circuit of each of said node stations comprises:
- a command receiving circuit, operatively connected to said clock error detecting circuit, for detecting commands sent from said supervisory station; and
- a loop-back control circuit, operatively connected to said command receiving circuit, said level error detecting circuit, said clock error detecting circuit and said connection line, which outputs loop-back signals in accordance with said commands received by said command receiving circuit, said level error signal supplied from said level error detecting circuit, and said clock error signal supplied from said clock error detecting circuit; and
- said connection line comprises a transmission line switching circuit, operatively connected to said two duplicate loop transmission lines, said clock error detecting circuit and said loop-back control circuit, which establishes a loop-back path in accordance with said loop-back signals output from said loop-back control circuit.

10. A method of controlling the loop-back condition of a loop transmission system comprising a plurality of node stations, a supervisory station, and two duplicate loop transmission lines, which lines transmit signals in opposite directions, comprising the steps of:
(a) sending out loop-back commands to both of said duplicate loop transmission lines from said supervisory station when faults are detected on both of said duplicate loop transmission lines at the same time;
(b) establishing a loop-back path in each of said node stations while retaining a connection path to a succeeding node station upon the receipt of a loop-back command; and
(c) releasing said loopback path only in the node stations which receive signals normally from both of said duplicate loop transmission lines when said supervisory station sends release commands to said node stations after sending said loopback commands.

11. A method according to claim 10, wherein said loop-back path is released only in the node stations which receive said release commands from both of said duplicate loop transmission lines.

12. A method according to claim 11, wherein said loop-back path is released only in the node stations which receive the same release commands from both of said duplicate loop transmission lines.

13. A method according to claim 10, wherein said loop-back path is released only in the node stations which receive said release command from one of said duplicate transmission lines and receive signals normally from the other of said duplicate transmission lines.

14. A method according to claim 10, further comprising determining whether said signals are received normally when said signals have a magnitude larger than a predetermined value and when the synchronization of clock pulses extracted from said signals is not disturbed.

15. A loop transmission system for a plurality of communicating units, comprising:
- a supervisory station for sending loop-back commands;
- first and second transmission lines, operatively connected to said supervisory station, for transmitting signals in opposite directions; and
- node stations, each operatively connected to said first and second transmission lines and to the respective communicating unit, each node station comprising:
  - input signal means, operatively connected to said first and second transmission lines, for receiving the signals, checking the level and synchronization of the signals and providing input status signals, and for sending the signals;
  - transmission line switching means, operatively connected to said input signal means and the respective communicating unit, for providing signal line loop-back;
  - command receiving means, operatively connected to said input signal means, for receiving the loop-back commands and providing loop-back command signals; and
  - loop-back control means, operatively connected to said input signal means, said transmission line switching means and said command receiving means, for providing loop-back control signals in dependence upon the input status signals and the command signals, said transmission line switching means providing loop-back in dependence upon the loop-back control signal.

16. A system according to claim 15, wherein said transmission line switching means comprises:
- first and second logic circuits, operatively connected to said input signal means and said loop-back control means;

a third logic circuit operatively connected to said first and second logic circuits and said communicating unit; and fourth and fifth logic circuits operatively connected to said first and second logic circuits, respectively, said communicationg unit and said input signal means.

17. A system according to claim 16, wherein said first through fifth logic circuits each comprise:

first and second AND gates; and an OR gate operatively connected to said first and second AND gates.

18. A system according to claim 15, wherein said loop-back control means comprises:

a first OR gate operatively connected to said input signal means;

a first AND gate operatively connected to said OR gate and said command receiving means;

a first flip-flop operatively connected to said command receiving means and said transmission line switching means;

a second OR gate operatively connected to said input signal means;

a second AND gate operatively connected to said command receiving means; and a second flip-flop operatively connected to said second AND gate, said command receiving means and said transmission line switching means.

19. A system according to claim 15, wherein said command receiving means comprises:

first and second command registers operatively connected to said input signal means; and selection means, operatively connected to said first and second command registers, said communicating unit and said loop-back control means.

* * * * *

UNITED STATES PATENT AND TRADEMARK OFFICE
CERTIFICATE OF CORRECTION

PATENT NO. : 4,542,496

DATED : September 17, 1985

INVENTOR(S) : TAKEYAMA ET AL.

It is certified that error appears in the above-identified patent and that said Letters Patent is hereby corrected as shown below:

Col. 2, line 27, "abovementioned" should be --above-mentioned--;

line 46, "loopback" should be --loop-back--.

Col. 3, line 34, "a" should be --an--;

"an" should be --a--.

Col. 6, line 47, "abovementioned" should be --above-mentioned--;

"loopback" should be --loop-back--;

line 54, "loopback" (first occurrence) should be --loop-back--.

Col. 11, line 6, "communicationg" should be --communicating--.

Signed and Sealed this

Twenty-second Day of July 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,542,496

DATED     : September 17, 1985

INVENTOR(S) : Akira Takeyama, et al

It is certified that error appears in the above-identified patent and that said Letters Patent is hereby corrected as shown below:

On the title page the following should be added:

-- [30]    Foreign Application Priority Data

Aug. 30, 1982    [JP]    Japan..................57-150480

Signed and Sealed this

Twenty-sixth Day of August 1986

[SEAL]

Attest:

DONALD J. QUIGG

Attesting Officer    Commissioner of Patents and Trademarks